July 18, 1939.  J. N. FREEMAN  2,166,244
BRAKE TESTING DEVICE
Filed Sept. 8, 1936  2 Sheets-Sheet 1
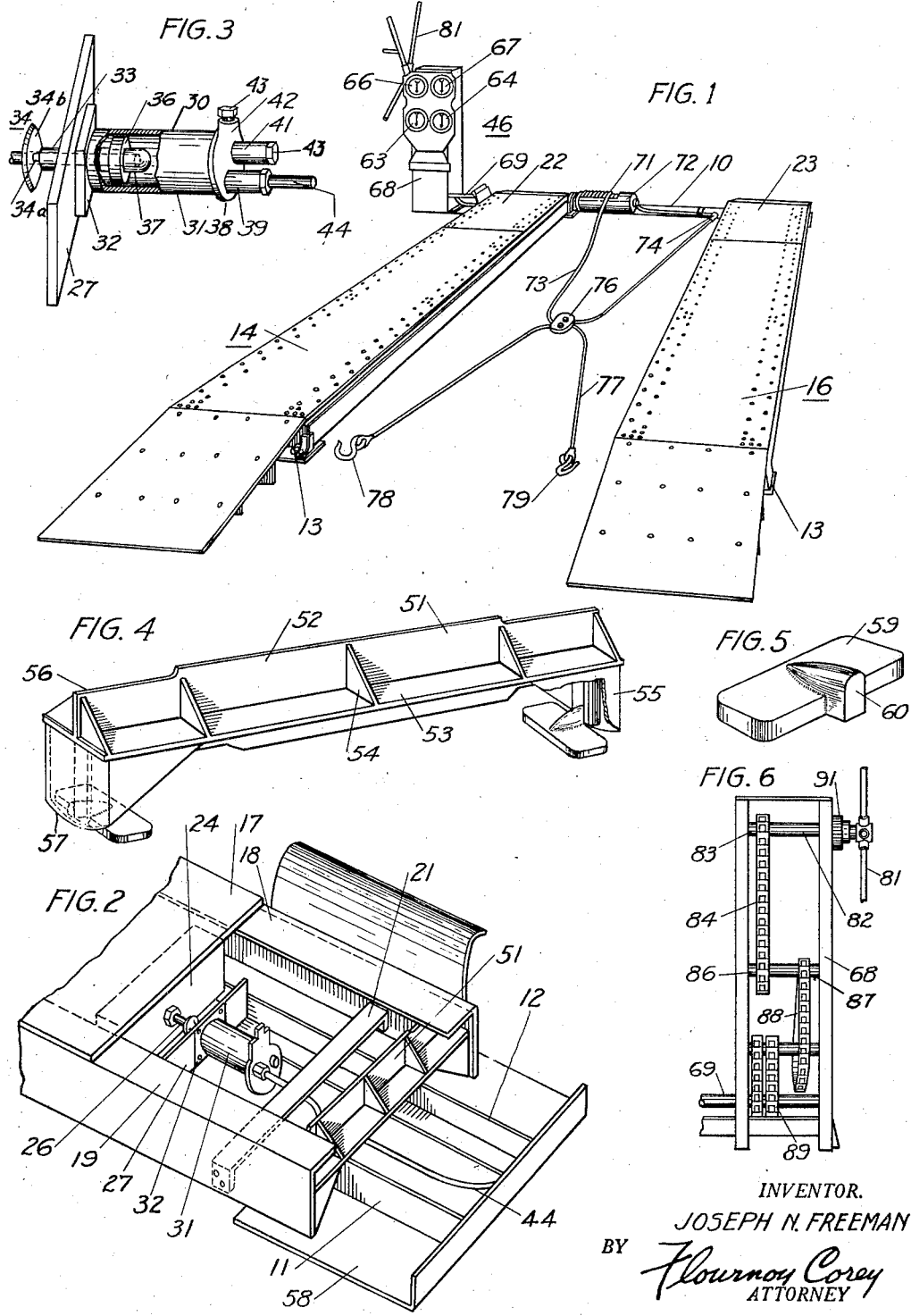
INVENTOR.
JOSEPH N. FREEMAN
BY Flournoy Corey
ATTORNEY July 18, 1939.                J. N. FREEMAN                2,166,244
                            BRAKE TESTING DEVICE
                            Filed Sept. 8, 1936          2 Sheets-Sheet 2

INVENTOR.
JOSEPH N. FREEMAN
BY Flournoy Corey
ATTORNEY.

Patented July 18, 1939

2,166,244

UNITED STATES PATENT OFFICE 2,166,244

BRAKE TESTING DEVICE

Joseph N. Freeman, Cedar Rapids, Iowa

Application September 8, 1936, Serial No. 99,719

3 Claims. (Cl. 265—47)

This invention relates to force measuring devices and has particular relation to a brake testing mechanism. It relates to force measuring devices, useful for motor vehicle servicing and has particular relationship to means for accurately and definitely detecting, measuring and clearly indicating any and all defective parts and functioning of any part of the stopping power unit of a motor vehicle, lightest passenger car to the heaviest truck, buses and fire department trucks and regardless of stopping power used, whether mechanical, hydraulic or air and at the same time providing simplified but accurate and dependable guides and means for correcting and adjusting any such improperly functioning units.

Various mechanisms have been proposed classified as brake testing devices, all of which are faulty in various respects for the purpose intended and have proven so in service.

One type, known to the art and automotive industry as the roller type, in which each of the four car wheels are positioned on two rollers, one roller to front and one to rear of the tire, leaving the bottom of the tire without traction, as is the normal traction when tires are resting on flat pavement surface.

The rollers are revolved by motor power, causing the car wheels to revolve against braking resistance. The rear roller is mounted on a floating bearing and contacts a hydraulic cylinder piston by means of an extended arm, and the pressure registers the braking resistance. Continuous revolving, with brakes applied, causes the brake drums to heat, and testing and adjustments are impossible under such condition. The car is anchored at the front axle which is below the center of gravity, and thus the brake linkage is distorted, and adjustments therefore are not reliable and dependable, since adjustments are not made under actual road conditions, neither in respect to the position the car takes when brought to a stop on the highway, nor as to tire traction. Because of inability to hold inertia brake resistance against tire traction, the machine lacks ability to indicate greasy or glazed brake lining, sluggish or frozen shoe anchors, sluggish brake cable, etc., and no ability whatever to detect defects in any part of a hydraulic braking system, such as leaky, defective line fittings, cylinders, and the like.

It is not useful as a merchandiser because of its height and bulky ponderous constructions, and is designed to be permanently mounted over a pit, not permitting drive on by the car owner, and the car must be backed off since it has no "drive over" feature. It is not equipped to hold and lock braking tension against tire traction, nor can the maximum of either braking resistance or tire traction be determined, because of inability of the machine to supply maximum tire traction. The machine is thus lacking in the essential features for checking and correcting braking power of automotive vehicles. Furthermore, the bearings of this type of machine are not devoid of friction, and but slight variance of friction between the four sets of rollers will cause false indication of braking resistance. With wet, or even slightly wet tires the car braking system cannot be checked.

Another machine, known as the "run-and-skid" type, supposedly of merchandising value because of its low construction and easy drive on and off feature, is lacking as such because of its impractical method of testing brakes, and fails entirely to provide means for indicating conditions of the braking system, such as brake lining, brake shoes, anchors cable, nor any part of a hydraulic braking system and no thought whatever is given to providing means for adjustments.

The idea of the machine is for the car owner to take a stand-still position about twenty feet to the rear of the device, and from that position put his car in motion and take a run for the device at from ten to twelve miles per hour, and at just the right moment, when all four wheels are on the machine, instantly apply his brakes, and the sudden stopping of the momentum of the car supposedly registering the stopping ability of the car. This method does give a fair demonstration of the stopping ability at ten to twelve miles per hour, but the same or better demonstration may be had by taking a run and skid over a paved alley or street where speed and distance would not be limited to the length of the device. There is no means provided for checking braking power under higher speeds or a maximum braking resistance.

Furthermore, as is generally known, instant application is not the proper nor best method to bring car to a stop within the shortest distance and particularly under medium or high speed, besides such sudden application will, in many instances, either cause the braking system to fail completely or cause freezing of brake shoes, and thus is extremely dangerous.

Braking resistance and tire traction are each dependent upon the other. The efficiency of either is limited to the maximum efficiency of the other. If either fails the other becomes useless to bring the momentum of vehicle to a stop. Therefore, locking and testing one against the other must necessarily be the basis of operation for adjustments to obtain a maximum stopping power and particularly for emergency stopping under high speed.

While it is understood that the braking resistance of the two rear wheels of the motor vehicle must be equalized in braking resistance and that, of course, applies to the front pair of wheels as well, but the rear and front pair have no relationship to each other as to amount of braking power provided. The front pair of wheels must have greater braking power than the rear wheels since, in bringing the car to a stop on the highway, under medium or high speed, the center of gravity and weight of the vehicle is shifted to the front wheels, thus providing greater tire traction to the front wheels and lessening traction of the rear wheels. Should the braking power in the front and rear pair be equalized, and, in stopping, thus shifting some of the weight from the rear wheels to the front wheels, the rear wheels would receive too much braking resistance for the amount of traction present and would skid as the result and thereby make the entire stopping power not only useless, but dangerous.

Instant application of brakes from minimum to maximum travel of brake pedal, like a hammer blow, is not the correct nor efficient method for bringing the vehicle to a successful stop within the shortest distance, and furthermore is extremely dangerous as, under such application, it is known that some one of the four brakes will freeze and lock and particularly with a mechanical brake where the hammer blow is as instantly transmitted to the brake shoes, whereas, with a hydraulic system, the instantaneous or hammer blow application will either entirely fail or retard rather than expedite the flow of fluid from the master cylinder to the four auxiliary ones, checking the braking action. Therefore, quick thinking and instant action, but gradual application of brake pedal will stop a car within the shortest distance and safely so.

I have, therefore, devised a brake testing device which embodies different principles of operation than those employed in devices known to the art. In a device constructed according to my invention, I provide means for positively driving or pulling a vehicle over a platform and then measuring the resultant force or reactive force set up in the platform by applying the brakes of the vehicle. A device of this character secures many advantages over the devices of the prior art. With a device constructed according to my invention I may obtain the comparative braking values obtained through varying degrees of pressure applied by the operator. Furthermore, I am enabled to measure the static braking effect of the brakes of a motor vehicle. A marked advantage of my device is that the brakes may be set and a stress applied to the vehicle tending to move it forward without actually doing so and in this manner the mechanic may determine whether or not the brake drums are covered with oil or if the lining has become hardened. If the brake drums are oily or the brake linings hardened, they will permit the wheels to slip some time after the stress has been applied to the vehicle.

My device, however, is not limited to motor vehicle stopping and power servicing. It will, as well, accurately check and indicate motor cylinder compression, whether four or more cylinders, registering the compression of each cylinder separately.

Therefore, because of its wide range ability, as well as practicability, it is of inestimable value to every branch of the automotive industry, including gas servicing stations, fleet owners, fire departments, municipalities and highway patrols, for use in safety lanes.

It is also valuable as a merchandiser, because of its "close-to-the-ground" construction and wide run-ways and easy-drive-on and off by car owner, whether man or woman, without danger of falling off and it thereby stimulates frequent inspection and servicing and promotes sale of various commodities and service offered by servicing garages and gas filling stations.

It is, therefore, a general object of my invention to provide a brake testing device which will measure the static braking effect and which will indicate the fact that the brake linings are covered with oil and the like or otherwise faulty so they will not hold over a long period of time.

Another object of my invention is to provide an improved platform supporting means for testing devices of this general character.

Another object of my invention is to provide a new and improved brake testing device which operates under the principle of an outside force moving the vehicle instead of depending on the inertia of the vehicle in motion.

Another object of my invention is to provide a new and improved indicating means for brake testing devices.

Another object of my invention is to provide an extremely simple and effective brake testing device.

Another object of my invention is to provide an improved hydraulic system for measuring braking efforts in a brake testing device.

Another object of my invention is to provide, in a brake testing device, an improved hydraulic jack and hydraulic jack mechanism and system for conveying the force acting on a platform to an indicating instrument.

Another object of my invention is to provide an improved platform structure for brake testing devices.

Other and further features and objects of the invention will be more apparent to those skilled in the art upon a consideration of the accompanying drawings and following specifications, wherein is disclosed exemplary embodiments of the invention, with the understanding, however, that such changes may be made therein as fall within the scope of the appended claims, without departing from the spirit of the invention.

In said drawings:

Figure 1 is a view in perspective of one embodiment of my invention.

Figure 2 is a fragmentary perspective view of one of the hydraulic jacks and of the structure on which this jack is mounted.

Figure 3 is a view in perspective of the hydraulic jack with a section of the cylinder partially broken to better show the structure, the view being taken looking from the top of the structure.

Figure 4 is a view in perspective of one of the rocker supports for the platforms of the device shown in Figure 1.

Figure 5 is a view in perspective of one of the means by which the support shown in Figure 4 is mounted on the brake testing device.

Figure 6 is a view in side elevation of the actuating gear and chain mechanism for pulling the vehicle across the platform.

Figure 7:
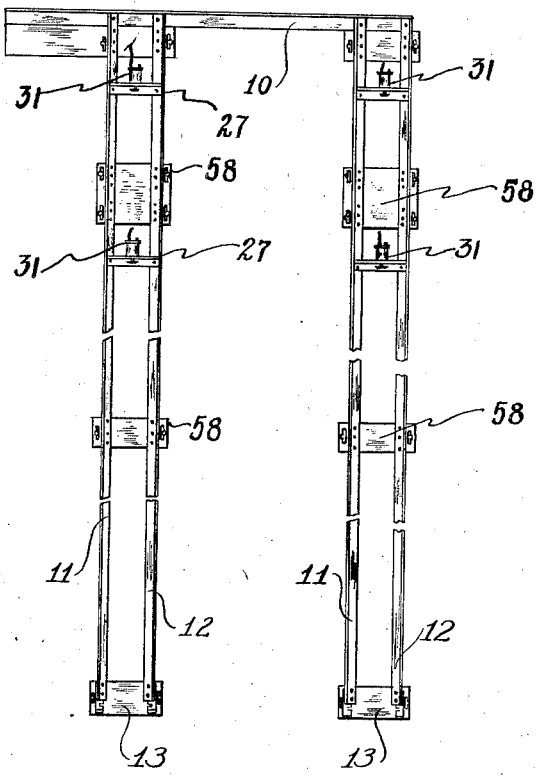
Figure 7 is a plan view of the supporting structure of the device shown in Figure 1.
Figure 8:
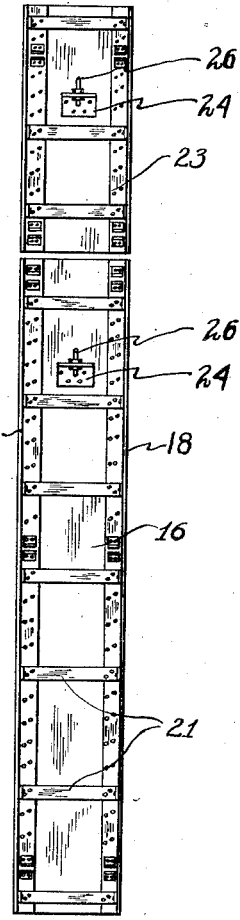
Figure 8 is a view, from beneath, of one pair of the platforms of the device shown in Figure 1.

To provide a machine with the wide range of service and to function correctly as prescribed I proceeded as follows:

First, I designed a skeleton frame as a base or foundation, constructed of steel angles and plates.

Second, within this base I provided means for installation of all equipment provided beneath the platforms, such as the rocker bearings, bearing guide dogs, hydraulic cylinders, hydraulic line tubing, platform back stops, cable drum and cable anchor, front and rear approach supports, drum shaft and shaft bearings and a front leftward extension of said base on which to mount pulling power gear, ratchet dog, hand power wheel, as well as panel for mounting of indicating gauges, to which hydraulic tubes are connected leading from cylinders mounted under each of the four platforms, each independently.

In a device of the character illustrated in Figure 1, I preferably employ a heavy cross channel 10 which acts both as a support for the car moving device and for the indicating devices and also serves as an anchorage for the winch which is used in moving the car. The channel also supports the ends of the platform structures. This cross frame 10 is a long narrow channel or angle member upon which a plurality of rails 11 and 12 are mounted. The rails 11 and 12 are angle-iron members so positioned that the horizontally extending flanges thereof extend toward each other and these horizontally extending flanges are secured to the horizontally extending portion of the cross channel 10. The remote ends of the pairs of angle-irons 11 and 12 are joined by other plates, indicated at 13, to afford a pair of rectangular frameworks upon which the platforms 14, 16, 22 and 23 may be mounted.

The platforms 14 and 16 are comprised of rectangular plates 17 and siderails 18 and 19 extending downwardly to meet the angle-irons 11 and 12, the rails 18 and 19 affording stiffening means for the plates 17 and also shields to prevent dirt and the like from working its way into the operating parts of the platform. The rails 18 and 19 are joined by cross members 21 at spaced intervals along the length of the platform. The long platforms 14 and 16 are for the back wheels of the vehicle and by reason of their length can take care of vehicles of varying wheel base. The platforms are preferably 18 inches or more in width to take care of trucks as well as passenger vehicles. There are no flanges on these platforms so vehicles with dual wheels may be accommodated as well as those on which single wheels are employed.

Other platforms 22 and 23 are provided at the front end of the platform structure and these short platforms are used for testing the braking effect of the front wheels of the vehicle. The structure of these front wheel platforms is substantially the same as the rear wheel platforms 14 and 16 except that smaller number of supporting members hereinafter described are used.

A downwardly and transversely extending flange or buttress member 24 is provided for each of the platforms and these buttress members are adapted to extend downwardly between the frame members 11 and 12. The center of the downwardly extending portion of the buttress member or angle 24 is drilled to receive a stud bolt 26 which may be moved back and forth through the angle 24 to vary the in-and-out position of the stud bolt to adjust its position with reference to the hydraulic jack hereinafter described. Another set of transversely extending plates 27 are located between the frames 11 and 12 with one beneath each of the platforms and these transversely extending plates serve as means for mounting the jacks 31 thereon. The jacks 31 are comprised of a cylindrical body 30 having a rectangular flange at the end adjacent the plate 27. The plate 27 and flange 32 are drilled centrally thereof to receive the plunger or ram 33 of the jack. This ram or plunger 33 is drilled for almost its entire length to receive the stem 34a of the pushrod 34. The head of the pushrod 34 is enlarged, as indicated at 34b, in order that the stud 26 may impinge readily thereon. The pushrod 34 extends entirely through the piston 36, which is located within the cylinder 30, and is received within a boss 37 on the opposite face of the piston 36. By means of this construction the force of the pushrod 34 is applied on the opposite side of the piston 36 to pull it rather than force it ahead of the pushrod to thus prevent or minimize the tilting of the piston in the cylinder. The end of the cylinder opposite from the flange 32 is enclosed by means of a head 38 having three bosses 39, 41 and 42 thereon with the bosses 39 and 41 extending horizontally from the cylinder head and the boss 42 extending upwardly therefrom. All of these bosses are drilled but the bosses 41 and 42 are closed by means of stud bolts 43. In practice either of the bosses 39 or 41 may be employed for the hydraulic pressure transmitting line 44 and the vertically extending bosses may be used for exhausting air from the hydraulic line.

It is now apparent that any horizontally acting forces in the direction toward the channel 10 are transmitted by means of the stud bolts 26 to the pistons 36 of the jack 31 and that this pressure acting on fluid within the jack will cause the pressure thereof to be transmitted through the transmission line 44 to indicating instruments indicated generally at 46.

The platforms 14, 16, 22 and 23 are free to move longitudinally of the supporting framework except for the pressure transmitting members including the plates 24, stud bolts 26 and jacks 31. It is important that these platforms be movable freely with a minimum of friction and I have provided an improved supporting means for each of the platforms. These supporting means include the rockers 51. The rockers 51, cast as units, comprise a vertically extending member or flange 52, a horizontal member 53, having ribs 54, and downwardly extending end members 55. A spaced interval at each end of member 52 is ground down slightly to rounded supporting edges, as indicated at 56, which edges are adapted to engage the under faces of rails 18 and 19 to provide a practically frictionless rounded edge support for the platforms as hereinafter described. The downwardly extending end members 55 are rounded on their lower edges, as indicated at 57, to permit the supporting member 51 to have rolling contact with plates or supporting members 58 secured at spaced intervals along the frame members 11 and 12.

The rounded portions 56 and 57 of the rocker 51 are not arcs of true circles but the lower portions 57 particularly are flattened slightly to cause the platforms to be raised slightly, as the rockers are rolled from the normal vertical position. This raising effect amounts to only a few thousandths of an inch but is sufficient to cause the weight of the vehicle to return the platforms and rockers to the normal mid position with the rockers in vertical position. This flattening of the rolling circle is a small fractional part of an inch but is sufficient to overcome friction and permit the weight of the vehicles to return the platforms and rockers to normal position.

Pivot members 59, indicated in Figure 5, are secured to the supporting members 58 and are adapted to engage the supporting member 51 as follows. The pivot members 59 consist of rectangular plates having outwardly extending semi-cylindrical members 60 as a part thereof. These semi-cylindrical members 60 slope or taper inwardly and are received in sockets 61 on the downwardly extending portion 55 of the supporting rockers 51. The purpose of the bosses or members 60 are to maintain the supporting members 51 in proper position on the cross members 58 with respect to the supporting frame members 11 and 12 but to do this without interfering with the rolling movement of the supporting member 51. In this way the platforms may move quite freely longitudinally of the supporting frame members 11 and 12 so that any force acting longitudinally of the platform toward the channel 10 or front of the brake tester will be transmitted directly to the hydraulic jacks.

Hydraulic pressure on the various jacks is transmitted by means of tubing such as indicated at 44, Figure 3, to the pressure indicating devices 63, 64, 66 and 67 mounted on the box-like standard 68. A shaft 69 extends longitudinally along the channel 10 and into the standard 68. A winch drum 71 is mounted on the exposed end of the shaft and this drum is covered by means of a cylindrical cover 72 except at its upper portion. The drum 71 is helically grooved in order that a cable 73 may be wound thereon, one end of the cable 73 is secured to the drum and the other end is secured to the channel 10, as indicated at 74, in such manner that loop of the cable may be located in use substantially midway between the platforms. A sheave 76 is provided having two pulleys therein and one pulley receives cable 73, while the other pulley receives a loop of cable 77. The cable 77 is provided with hooks 78 and 79 at the ends thereof and these hooks are hooked to the rear bumpers of the cars to be tested or to any other suitable part of the vehicle. By hooking up the hooks 78 and 79 to the rear of the vehicle and winding up on the drum 71, cables 73 and 77 will exert stress on the vehicle pulling it forward or tending to pull it forward. By pulling on the bumper the force action of gravity in negative acceleration of the vehicle in braking is closely approximated, as the bumper lies substantially in the horizontal plane in which the center of mass is located.

The means for rotating the shaft 69 and thus the drum 71 includes a capstan 81, (see Figures 1 and 6). The capstan 81 is secured on a shaft 82 extending transversely of the standard 68 and journaled for rotation therein. The shaft 82 has a sprocket 83 thereon which drives the chain 84 to rotate a large sprocket 86. The sprocket 86 rotates a shaft 87 which is operative through other reduction gearing, indicated generally at 88 and 89, to rotate the shaft 69. Obviously, considerable force may be applied to the shaft 69 by rotation of the capstan 81.

To condition the apparatus for use, the cylinders of the hydraulic jacks and the associated pressure transmitting lines are exhausted of air and completely filled with fluid. Thus I have a solid line of fluid with all air pockets eliminated. Air pockets will cause a cushion effect, whereas a solid line of oil fluid is as solid and rigid as a piece of steel. Therefore, the slightest movement on the part of the adjusting bolt on the run-way against the piston of the hydraulic cylinder is instantly reflected to the indicating gauges.

Thus, I have provided another important feature within my device not contained in any other mechanism.

In operation the vehicle to be tested is driven on the platforms with the front wheels on the rear of the platforms 22 and 23 and the rear wheels on the rear of the platforms 14 and 16. The cable 73 is unwound on the drum 71 and the hooks 78 and 79 are secured to the rear bumper of the vehicle and the operator applies the brakes. The capstan 81 is rotated to first apply a stress to the vehicle without moving it and the reading of the pressure indicating instruments 63, 64, 66 and 67 noted. This stress is maintained for a period of a minute or more to find whether the brakes will slip after once being engaged. If they do slip, it is an indication that the brake linings are covered with grease or oil, or the like, or that the braking mechanism of the vehicle is otherwise faulty. A ratchet device, indicated at 91, is employed for holding the capstan 81 to prevent it from rotating to relieve its stress on the vehicle.

After the static friction of the vehicle brakes has been found, the capstan 81 is rotated again to continuously pull the vehicle forward on the platform. One or more readings of the pressure indicating instruments is taken under these conditions to thus ascertain the lining friction in terms of pounds pressure on the various hydraulic jacks to determine the efficiency and relative efficiency of the vehicle brakes. Obviously, the results thus secured are very effective in indicating to the vehicle operator the condition of his brakes and thus obtaining for the owner of the testing device the work of adjusting or repairing the brakes.

Devices constructed according to my invention are extremely simple and sturdy in structure and easy to operate. The devices are inexpensive to manufacture and maintain. They are preferably shipped complete ready for use. They need no pit or prepared base for mounting and may be readily shifted from place to place. They may readily be placed, for instance, in the drive-way of a filling station where the brakes of a vehicle may be tested without the driver leaving his seat. They are thus very effective as merchandising agencies.

The devices are particularly effective to indicate faulty or inefficient braking mechanisms. If, for instance, stress tending to move the vehicle, but not actually moving it, is applied to the vehicle and held by the ratchet devices and the brake bands are glazed, the indicator corresponding to the faulty brake will move up and come back jerkily. If the bands are badly impregnated with grease, the indicator drops down as soon as the vehicle moving effort is stopped. If the bands are only slightly greasy, the indicator moves back slowly. If the wheels slide, as for instance with a worn tire, the indicator will chatter. The brakes are only as effective as the tire traction will permit and the owner of the machine may sell the operator a new tire for the worn tire.

The devices are also effective to disclose faulty hydraulic systems and will indicate which wheel mechanism or mechanisms are defective. They may also be utilized to test the cylinder compression of a vehicle by moving the vehicle along against the compression of the motor. They lend themselves readily to diagnosis of the vehicle mechanism and the operator, with a little experience, can ascertain the vehicle faults merely by the "feel" as he rotates the capstan.

The results secured are very accurate and not only indicate the braking effects of the brakes but indicate whether or not the brakes will slip after pressure has once been applied.

The platforms constructed of heavier steel angle than the base, though light steel top plates, but securely bridged and braced contain only two items of equipment. The adjustable cap screw which contacts the hydraulic piston plunger and the guides for the top part of the rockers.

Thus the machine is simply constructed and ready for assembly by placing the rockers over the pivot members 59 mounted in the base, and then placing the platforms on the rockers, positioned as indicated by the guide lugs within the upper part of platforms. At the front of each of the four platforms, a short section of the top plate of the platforms, directly over the position of the hydraulic cylinders mounted within the base, is removable, permitting access not only to the cylinders but for adjusting the stud bolt up to the piston plunger with slight but the same amount of pressure to each of the four piston plungers, to an indicated mark on the dial of the indicating gauges so that all four platforms will start off with the same amount of hydraulic brake resistance. The amount of such resistance is approximately one pound of hydraulic gauge resistance of the gauges used.

The rocker bearings are the heart of the machine and ideally suited for the purpose since only ⅜" maximum movement or travel is required as in the case of this device and provides a free, rolling, practically frictionless bearing, more so than ball bearings or even knife edged scale bearings. The movement is so sensitive as to indicate the slightest brake drag, sluggish wheel bearing or other causes tending to retard free spinning of car wheels if rotated with the brakes not applied.

The bottom of the rocker is no part of a perfect circle but is so shaped at the bottom as to be balanced within 999 and 999¹⁄₆₄ of 1000, with the slight off-balance tending backwards to permit its returning itself to a resting position to rear or at starting point.

The bottom of rocker is designed with suitable slot to ride over the pivot members mounted within the base. The purpose of these pivot members is to position the rockers in their proper locations in relationship to the positioning means mounted on the inside top of the platforms, regulating the proper position of the top of the rockers, which are positioned ⅜" to the rear of the dogs at the bottom of the rocker so that the platforms resting on the rockers is naturally positioned to a resting and limited position to the rearward to the extent of ⅜". Each of the four platforms is designed to be provided with suitable means for rearward resting position, all properly spaced so that the starting point for forward movement of rockers is uniform at definite points of the bottom curves of the rockers.

The top of the rocker, the portion at both ends which supports the platforms, is perfectly rounded so that when tilted forward by the braking resistance and tire traction contacting the platforms, the rocker will roll freely and frictionless as does the bottom.

After first forward movement of platforms, the rockers position themselves into an easy, free rolling position and do not contact dogs at bottom or lugs at top and will hold their respective positions without guides either at top or bottom of the rockers.

The particular curve at the bottom of the rocker is thus designed, not only for near balancing and free and easy rolling, but to retain a level movement of the platforms resting on top of the rockers.

The rockers are so constructed that the platforms rest only directly over the rockers proper at both ends of the rocker arms and therefore the entire weight is carried at those points, no part of platforms contacting any part of center of rocker. Thus the weight of the motor vehicle is thus supported.

I have attached a fine tooth ratchet and dog on to the same shaft as the hand power wheel. Without this simple but important device as part of the whole unit, the machine would be lacking and limited not only in its general efficiency but in its wide range of performance and service.

The purpose of this ratchet and dog device is simply to hold braking resistance against tire traction inertia, at any point or degree of tension and is of greatest importance and necessary not only to check braking power, but is needed and necessary in making adjustments.

Thus, in being enabled to hold inertia, the braking resistance at any point of application against all points of tire traction, I am able to accomplish many operations in testing and correcting braking power, utterly impossible with any other piece of equipment, even those specifically designed for braking servicing.

When the car is driven on to the machine and each of the four wheels is resting on the four individual and independent platforms which are in contact with independent hydraulic cylinders, with tubing leading from each to each of the four independent indicating gauges, the two hooks attached to the cable are placed over the base or bracket of the rear bumper and with a few revolutions of the hand power wheel and the slack taken out of the cable between the hook-up and cable drum, the car is ready for a test.

The brakes are then applied, lightly to begin with, either by foot or mechanical depressing device, the dog is placed in operating position with respect to the ratchet and the car is pulled forward, by the hand power wheel connected to reducing gears to the drum, slowly and resting at intervals with the ratchet and dog holding the tension as it is gained and increased at intervals, thus checking braking resistance against tire traction and at the same time pulling that part of car above the springs or above center of gravity, ahead of the running gear or into the position the car will take when being brought to a stop on the highway. Thus slowly pulling car and at the same time slowly increasing braking resistance, with moments of hesitation, and the ratchet dog never permitting tension gained to be relaxed, observation of braking power is made from low pedal pressure to maximum and tire traction of each wheel determined in relationship to braking resistance.

Thus, during relaxing periods or holding the test inertia at the various points of brake shoes or resistance or tension, various weak and defective conditions are revealed and so registered by the indicating gauges such as greasy, glazed or worn brake lining, sluggish brake shoe anchors, sluggish or improper adjusted brake cable or any leaks in any part of a hydraulic brake system as well as to indicate the location of the defective parts through the particular wheel, which is lacking in braking power. That is, should one line or one auxiliary cylinder be defective, the defect will be reflected in that particular wheel and indicated and registered by the one gauge handling that wheel but, should the master cylinder be defective all four wheels will be affected and so indicated by all the indicating gauges.

When, as an example, there is the presence of greasy lining in one wheel and the braking resistance of the car is locked against tire traction and held inertia, the brake shoe against such greasy lining has no holding resistance against the greasy lining and, therefore, that brake will relax either fast or slowly, depending upon the amount of grease present and the pointer of the gauge will likewise relax or retard fast or slow. Should the brake lining be glazed, the shoe will relax and release in a jerky movement and that sort of movement is likewise reflected by the gauge indicator. The situation is the same with a leaky or defective hydraulic system. A slow leak is slowly indicated by the gauge and a fast leak causes the gauge indicator to recede more rapidly. In the even of defective or leaky master cylinder, all four gauges will indicate the condition whereas with a leak in one of the lines only, or in one of the auxiliary cylinders, one of the gauges will indicate the particular wheel effected, slowly or fast, according to the extent of the leak or defect.

The situation above related can be accomplished only by the means of the ratchet and dog permitting slow and gradual increase of braking resistance against tire traction and locking that resistance against the hydraulic resistant power of the machine. In that locked position and held inertia either the machine or the braking system of the car must show up its defects, if any are present, but the machine hydraulic system being tested for leaks and the lines and fittings sealed and therefore no leaks possible, the car braking system must and does reveal its weak spots. If none are present, the gauge indicator will hold steady at their various positions reached, according to the amount of resistance applied by the car braking resistance and tire traction. Tire traction is indicated by the slipping movement on the surface of the platforms and braking power is applied to each wheel up to that limit of traction to all four wheels which, however, does not mean that the rear wheels have as much braking power as the front pair but properly proportioned ratio between front and rear, depending on the weight of the car.

It is understood that the adjustments are made with the car pulled into the same position it takes on the highway when brought to a stop with the center of gravity and weight shifted to the front wheels. Thus the indicators will show more braking power in the front pair of wheels than in the rear pair but they are equalized up to the limit of tire traction, which is the limit of stopping power for any one of all four wheels. Thus the limit of braking power must be limited to the tire with the weakest or least traction, considering however the wheels in front and rear pairs.

Sluggishness and sticky brake cables are indicated not when brakes are applied nor when the car is pulled forward and thus held, but when braking power is released and all tension relaxed permitting also the relaxing of the gauge and the pointers receding to zero but should there be a sluggish cable in one or more of the wheels and fails to relax or return to the starting position, it will hold pressure against the hydraulic cylinders which pressure is reflected in the gauge and keeps the indicator pointer from relaxing to zero. If the cable, because of its sluggish condition due to hardened grease relaxes slowly, the gauge indicator will likewise retard slowly but usually not to zero, whereas if cable were free in its movement backwards, the gauge pointer will return just as freely.

A machine constructed according to my invention requires no permanent installation or mounting over a pit. It may be placed anywhere on reasonably level floors and shifted as desired and may be used outdoors, as for instance, alongside of gas pumps at filling stations, on the street for municipalities, for use for safety lanes and on highways for use by highway patrols and is further useful for automobile manufacturers for use at the end of production lines, for checking and adjusting brakes in pairs and proper relation between front and rear pair of wheels as well as to check for defective fittings and leaks and other defects throughout the entire hydraulic braking system.

A device constructed according to my invention will, if the faults are existent, and without the necessity of removing a wheel of a motor vehicle to examine the conditions of the interior working parts of that part of the braking system, indicate greasy, glazed and otherwise defective brake lining and whether slightly or extensively greasy, glazed or defective, sluggish and frozen brake shoe anchors, sluggish brake cables, dirt or grease in brake drums, tire traction and defective tube fittings in any part of the lines or tubes of hydraulic brake systems, defective hydraulic cylinders and indicate whether the master cylinders or one of the auxiliary cylinders are faulty and which one of the latter, and the extent of the leak or defect.

It is apparent that modifications of my invention may be made by those skilled in the art, which modifications may be made without departing from the spirit and scope of my invention as set forth in the appended claims.

I claim as my invention:

1. In a brake testing device, a supporting framework and a platform mounted on the supporting framework for longitudinal motion thereover, and means for mounting the platform on the framework comprising a transversely extending rocker member having a pair of rounded portions at its upper edge and having slots at its lower side, means on the framework for engaging the slots of the rocker and the rocker having curved lower edges adapted to roll on the supporting framework.

2. In a brake testing device of the character described, a supporting framework, a platform mounted above the supporting framework, and means mounting the platform for longitudinal movement with reference to the supporting framework comprising at least one transversely extending rocker member having the upper portion thereof formed in the shape of a knife-like, vertically-extending member rounded at its upper edge and having the lower portion thereof formed in two opposed end members having vertical slots on the inner wall thereof and having the lower edge of said end members curved to permit the rocker to roll longitudinally with respect to the supporting framework and platform, and pivot members on the supporting framework adapted to be received within the slots within the end members of the rocker member.

3. In a brake testing device, a supporting framework, platforms mounted above the supporting framework, and means for mounting the platforms for frictionless movement longitudinally with reference to the supporting framework comprising transversely-extending rocker members having the upper portion thereof formed in the shape of a knife-like vertically extending members and having the lower portion thereof formed in two opposite end members having the lower edge of said end members curved to permit the rocker to roll longitudinally with respect to the supporting framework, and the inner walls of the end members being grooved, pivot members on the supporting framework adapted to be received in the grooved end members of the rocker member, means for pulling a vehicle over the platforms against the resistance of the brakes thereof, and indicating means operatively connected with the platforms registering the resistance of the brakes of the vehicle comprising hydraulic fluid systems having indicating gauges in conjunction therewith.

JOSEPH N. FREEMAN.